United States Patent [19]

Ward

[11] 4,117,805
[45] Oct. 3, 1978

[54] VIVARIUM

[75] Inventor: Nazareen Ward, Oakland, Calif.

[73] Assignees: Elizabeth Ward; John Tribble; Lee Gordon; Frank Irving, all of Oakland, Calif.

[21] Appl. No.: 747,430

[22] Filed: Dec. 3, 1976

[51] Int. Cl.² .............................................. A01K 64/00
[52] U.S. Cl. ....................................................... 119/5
[58] Field of Search ................................ 119/5; 47/69

[56] References Cited

U.S. PATENT DOCUMENTS

| | | | |
|---|---|---|---|
| 919,157 | 4/1909 | Glaser | 119/5 X |
| 1,263,391 | 4/1918 | Eickemeyer | 119/5 |
| 1,965,323 | 7/1934 | Taslitt | 119/5X |
| 3,854,450 | 12/1974 | Puckett | 119/5 |

*Primary Examiner*—Hugh R. Chamblee
*Attorney, Agent, or Firm*—Bielen and Peterson

[57] ABSTRACT

A vivarium including an aquarium, and terrarium separated by an expansion chamber for refilling and circulating aquarium water. The expansion chamber is formed by a shield which surrounds the terrarium. A number of spouts may lead from the chamber to guide water from the aquarium inlet to the aquarium.

10 Claims, 3 Drawing Figures

VIVARIUM

BACKGROUND OF THE INVENTION

The present invention relates to a novel vivarium for aquatic and terrestrial life.

Aquariums have been placed in homes for centuries. Likewise, terrariums have graced abodes in order to conveniently view plants and animals of exotic origin. Many problems arise in the maintenance and care of aquariums which preclude their usage in many places. For example, water must be circulated to supply dissolved oxygen for support of aquatic life. Also, sufficient food and heat must be obtained of the species of aquatic animals are to survive.

Fish have a tendency to attempt escapes from aquariums by simply jumping from the body of water and perishing, unless discovered and returned to the water. Similarly, items placed in aquariums above the water surface are often dangerous to fish, since they may become stranded on such items out of the water.

Equipment necessary for the sustaining of aquatic life is often scattered about the aquarium which presents a cumbersome and unaesthetic situation.

SUMMARY OF THE INVENTION

In accordance with the present invention a novel vivarium for the sustenance of terrestrial and aquatic life is provided.

The vivarium utilizes an aquarium having a water inlet and a water outlet. The aquarium may be constructed of translucent material on the sides and bottom. A terrarium positions within the aquarium partially or in whole. The terrarium has walls which enclose a space for retaining soil or other solids, thus providing an area for terrestrial plant and animal life.

A chamber separates the terrarium and aquarium by the employment of a shield which surrounds the walls of the terrarium and spaces outwardly therefrom. The inlet to the aquarium enters the chamber which functions as a surge tank. The chamber may also be used as a holding tank for new or incompatable aquatic life, as well as presenting a barrier against fish jumping into the terrarium. Access between the chamber and aquarium is provided by the shield, and could take the form of a multiplicity of spouts directing water from the chamber to the aquarium. In general, the access would be at a higher level than the aquarium outlet to allow the accumulation of a body of water in the aquarium.

The vivarium may also include pump means to circulate the aquarium-water as well as an air pump for oxygenation and filtering of the water.

The aquarium and terrarium may be mounted on a stand which provides an enclosed shelf space for the various life supporting components such as an air pump, heating mechanism and the like.

The aquarium, shield and terrarium may be built of translucent material, including a common bottom portion. A light source placed beneath such a structure would illuminate and heat the vivarium above. Finally, the moisture evaporating from the circulating water and the surface of the aquarium water would be retained by a transparent top. The proximity of the aquarium to the terrarium permits healthy and rapid growth of moisture loving plants such as ferns, moss and the like.

The stand and aquarium and terrarium may be detachably connected for ease of movement. A variety of valves and fittings could be included to adapt the vivarium for this purpose.

As may be apparent a novel and useful vivarium has been described and it is therefore thought to be an object of the present invention to provide a vivarium for terrestrial and aquatic life which overcomes the incompatabilities inherent in each.

It is another object of the present invention to provide a vivarium which may easily be illuminated without obstruction of the inhabitants by the lighting mechanism.

Yet another object of the present invention is to provide a vivarium which aerates an aquarium and mists terrestrial plants simultaneously.

Still another object of the present invention is to provide a vivarium as is a compact unit which is aesthetically pleasing and quiet.

The invention possesses other objects and advantages especially as concerns particular features and characteristics thereof which will become apparent as the specification continues.

Various aspects of the present invention will evolve from the following detailed description of the preferred embodiments thereof which should be taken in conjunction with the accompanying drawings.

DETAILED DESCRIPTION OF THE PREFERRED EMBODIMENTS

Figure 1:
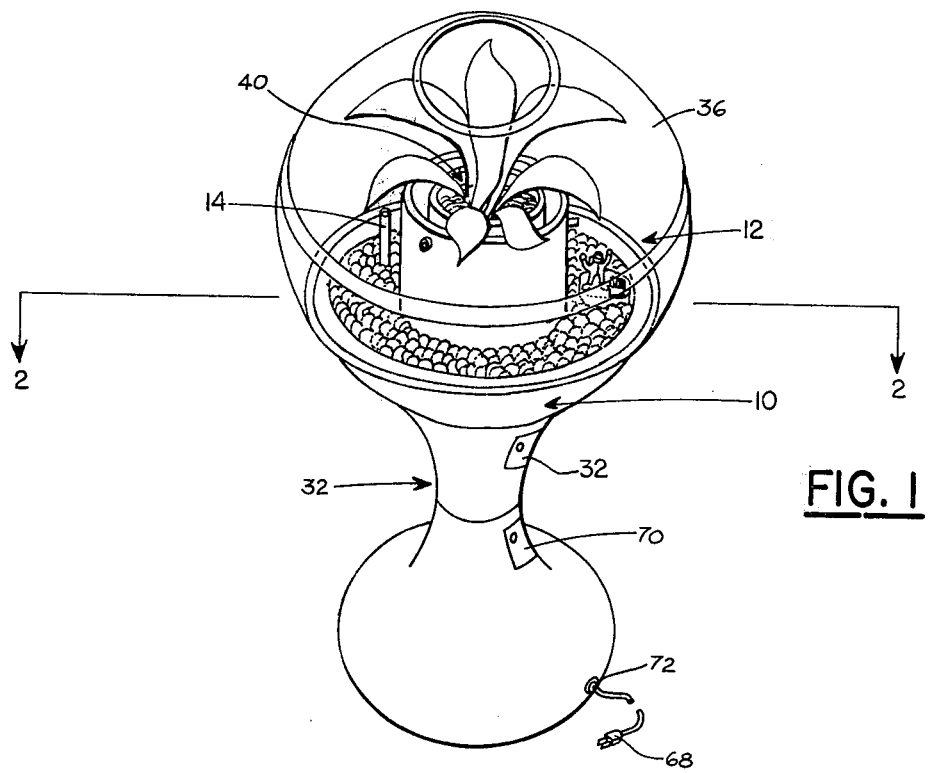
FIG. 1 is a perspective view of the invention without circulating water.
Figure 3:
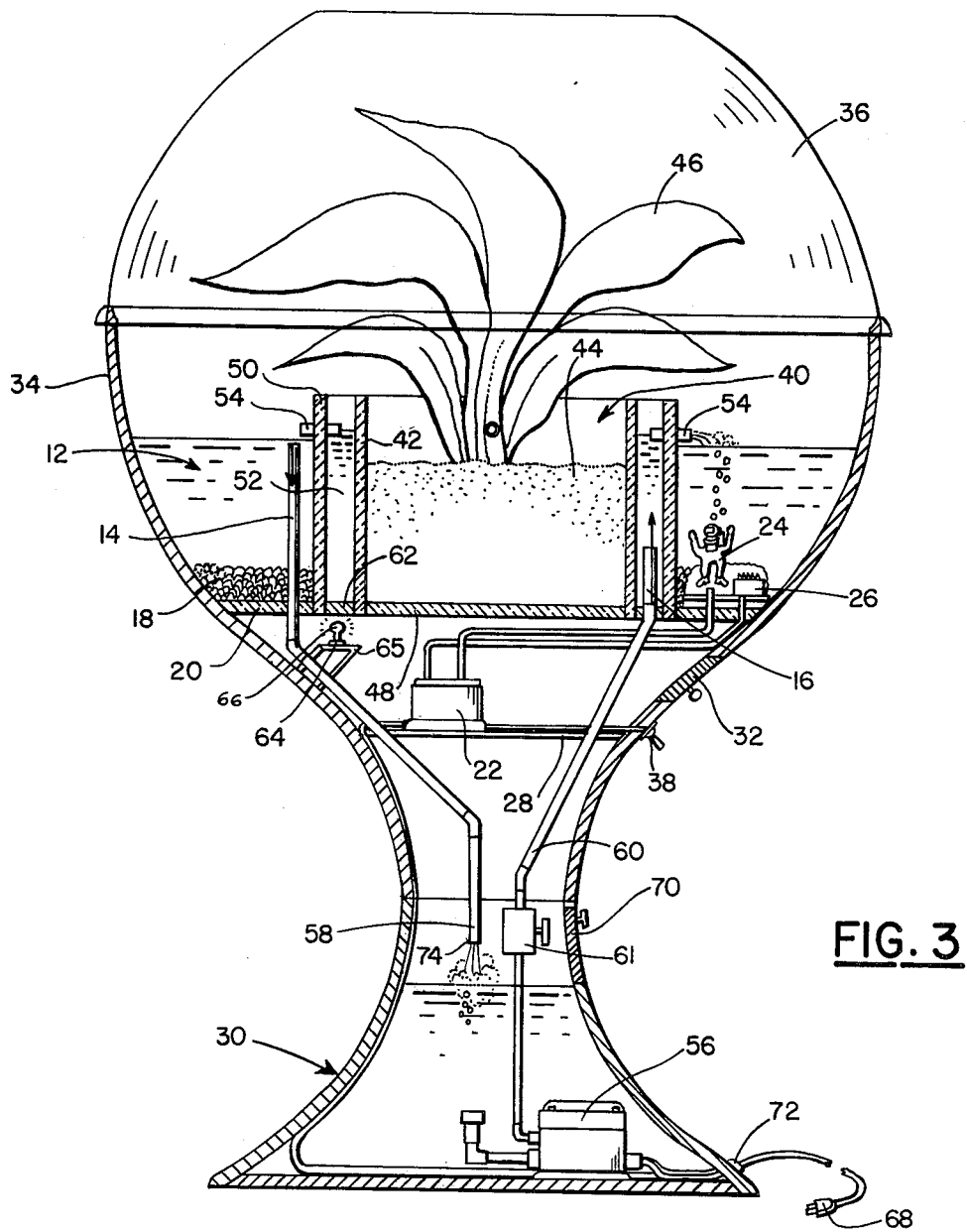
FIG. 3 is side elevational view of the invention with the lower portion of the invention shown in section.

The invention as a whole is shown by reference character 10 and includes as one of its elements and aquarium 12 with a water outlet 14 and a water inlet 16, FIGS. 1 and 3. The aquarium fills with water or liquid to a certain level and may contain gravel or sand 18 on the aquarium bottom 20. An air pump 22 supplies slightly compressed air to aeration means 24 and filter means 26. Air pump 22 rests on a shelf 28 within the pedestal 30 of the vivarium 10. Access door 32 permits maintenance and repair of the elements within pedestal 30, which will be further discussed as the specification continues. The aquarium wall 34 and bottom 20 may be formed of translucent material such as LUCITE or KAOLITE. A cover 36 fits over the upper edge of wall 34 and may be almost air tight, since oxygen and other life sustaining gases will be supplied by aeration means 24. Switch means 38, accessible to the exterior of pedestal 30 activates and deactivates air pump 22.

The vivarium 10 also includes terrarium 40 having walls 42 forming a solids retaining space 44 for soil, fertilizer, crock, and the like. For example, space 44 may support plant 46 or other terrestrial life. The terrarium also has a bottom 48 of the same construction as bottom 20 of aquarium 12

Figure 2:
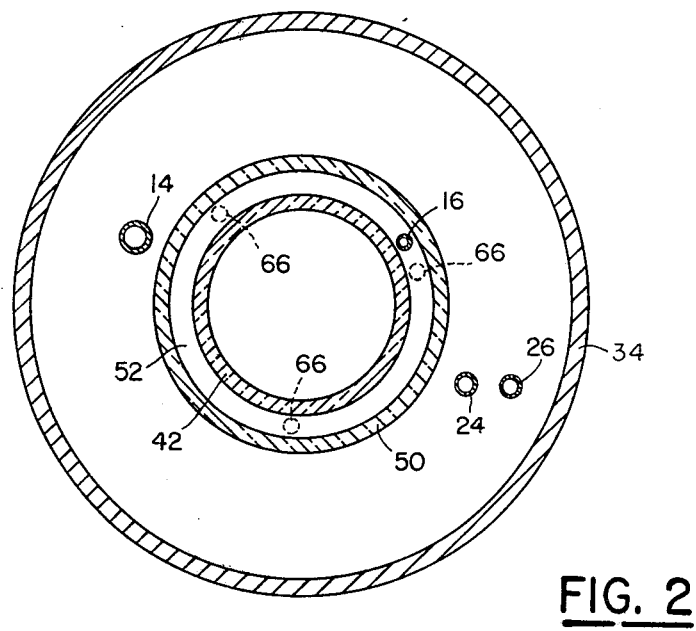
FIG. 2 is a sectional view taken along line 2—2 of FIG. 1.

Shield 50 surrounds terrarium walls 42 to form a chamber 52 therebetween. Access to aquarium 12 is provided by spouts 54, which may be spaced at certain intervals. Water from the aquarium inlet 16 would enter chamber 52, pass through spout 54 and flow into aquarium 12. Spacing spouts 54 from the top of water inlet 14 would produce a degree of turbulence in the flow of the water entering aquarium 12, thus providing additional aeration of the aquarium water and misting of plant 46. Water to the chamber 52 is circulated by pump means 56 and conduits 58 and 60, via valve means 61. Chamber 52 functions as a surge tank for water entering from inlet 16. Also, chamber 52 may be employed to segregate species of aquatic life that are incompatable such as adult and newly born fish. The cover 36 and chamber 52 serve to prevent fish from leaping outside the aquarium area. Directly below the bottom 62 of chamber 52 may be placed a light source 64 which may be a plurality of light bulbs 66 arranged below the bottom of chamber 52, FIG. 2 by brackets 65. The light from source 64 would radiate through the chamber 52 and illuminate the entire upper portion of the vivarium 10. Likewise, the light from source 64 could illuminate the pedestal 30 if it were constructed of translucent material, or light source 64 could be shielded from pedestal 30 illumination if desired. It should be noted that the bottoms 20, 48, and 62 of the aquarium 12, terrarium 40 and chamber 52 could be integrally molded to form a common bottom, but only bottom 62 of chamber 52 would be capable of transmitting the light from source 64. Light would be further carried by the internal reflection of wall 34 of aquarium 12 and the wall of pedestal 30. Light radiation entering chamber 52 would heat the water passing therethrough to aquarium 12.

Pump means 56 may be a submerged pump as depicted in FIG. 3; thus the lower portion of pedestal 30 would fill with water. Access opening 70 would permit the installation of pump means 56 as well as the throttling of valve means 61 to balance the flow of water through the system. Pump means 56 would also serve to heat the circulating water. Removable plug 72 would provide a drainage for the water within pedestal 30 in the course of maintenance and repair of pump means 56, conduits 58 and 60, and valve means 61. The termination 74 of conduit 58 may be positioned above the surface of the water within pedestal 30 to provide the sound of running water if desired.

In operation, aquarium 12 is filled with water above the outlet 14. Valve 61 is turned on to prime pump means 56. Terrarium life aw well as aquarium life are placed in their respective areas and pump means 56 is activated by plug 68 being inserted into an electrical outlet. Water is forced into chamber 52 and enters aquarium 12 through spouts 54. Aeration is provided by air pump 22 and aeration means 24. Cover 36 is placed over wall 34 to enclose aquarium 12 and terrarium 40. Light source 64 and bulbs 66 are turned on by switch means 38 to illuminate and heat the vivarium 10.

While in the foregoing specification embodiments of the invention have been set forth in considerable detail for purposes of making a complete disclosure of the invention, it will be apparent to those skilled in the art that numerous changes may be made in such details without departing from the spirti and principles of the invention.

What is claimed is:
1. A vivarium comprising:
   a. an aquarium having a water outlet and a water inlet;
   b. a terrarium having walls forming a solids retaining space, a portion of said terrarium positioned within said aquarium, said terrarium walls structurally connected with the structure of said aquarium;
   c. a shield surrounding said terrarium walls and forming an expansion chamber therebetween, said shield substantially rigidly selectively mounted to said aquarium and connected terrarium, said shield providing access between said aquarium and said chamber by means for providing an opening through said shield, said means being positioned at a higher level than said aquarium outlet, said means serving as said aquarium inlet;
   d. pump means for providing circulation of the aquarium water collected from said aquarium outlet to said aquarium inlet.

2. The vivarium of claim 1 in which said aquarium said shield and said walls of said terrarium are constructed of translucent material and said vivarium further comprises a light source radiating light from below said chamber.

3. The vivarium of claim 1 which additionally comprises a stand supporting said aquarium, chamber and terrarium, said stand having an enclosed spaced containing a shelf and an access opening thereto.

4. The vivarium of claim 3 which additionally comprises air means for providing a flow of air to said aquarium.

5. The vivarium of claim 1 in which said aquarium chamber, and terrarium have a common bottom.

6. The vivarium of claim 5 in which said aquarium said shield and said walls of said terrarium are constructed of translucent material and said vivarium further comprises a light source radiating light from below said chamber.

7. The vivarium of claim 6 which additionally comprises a stand supporting said aquarium, chamber and terrarium, said stand having an enclosed space containing a shelf and an access opening thereto.

8. The vivarium of claim 7 which additionally comprises air means for providing a flow of air to said aquarium.

9. The vivarium of claim 8 in which said access between said chamber and aquarium comprises a plurality of spouts.

10. The vivarium of claim 1 in which said chamber has a translucent bottom and the vivarium further comprises a light source radiating light from below said chamber.

* * * * *